Feb. 10, 1970  R. PLOG ET AL  3,494,499
CONTAINER WITH THREE-DIMENSIONAL INDICATOR
Filed Aug. 26, 1968  3 Sheets-Sheet 1

Inventors
RUDI PLOG
OTTO KRAMER
BY
McGlew & Toren
ATTORNEYS

Feb. 10, 1970    R. PLOG ET AL    3,494,499
CONTAINER WITH THREE-DIMENSIONAL INDICATOR
Filed Aug. 26, 1968    3 Sheets-Sheet 2

Inventors
RUDI PLOG
OTTO KRAMER
BY McGlew & Toren
ATTORNEYS

Feb. 10, 1970    R. PLOG ET AL    3,494,499
CONTAINER WITH THREE-DIMENSIONAL INDICATOR
Filed Aug. 26, 1968    3 Sheets-Sheet 3

Inventors
RUDI PLOG
OTTO KRAMER

BY *McBlew & Toren*
ATTORNEYS

United States Patent Office 3,494,499
Patented Feb. 10, 1970

3,494,499
CONTAINER WITH THREE-DIMENSIONAL
INDICATOR
Rudi Plog, Bietigheim, and Otto Kramer, Kirchheim
(Neckar), Germany, assignors to SWF-Spezialfabrik
fur Autozubehor Gustav Rau G.m.b.H., Bietigheim,
Germany
Filed Aug. 26, 1968, Ser. No. 755,328
Claims priority, application Germany, Aug. 26, 1967,
S 62,178
Int. Cl. B65d 41/00
U.S. Cl. 220—42                                                    6 Claims

ABSTRACT OF THE DISCLOSURE

A container, particularly for storing devices, such as warning signals for use in association with a disabled vehicle, comprises two telescopic container parts, at least one of which is provided with a three-dimensional graphic representation of the warning device contained therein. A graphical representation of a device, such as a reflecting warning triangle in one embodiment is mounted so that a single leg portion projects outwardly from the surface of the container and, the other two legs are foldable outwardly therefrom. An alternate embodiment of the container includes two telescopic parts having a plurality of longitudinally spaced interengaging complementary grooves and recesses. The container may be closed by engaging one or more projections of one of the container parts, and in a selected one of the series of inwardly spaced grooves of the other part, in order to close the two parts to an extent comparable to the size of the device to be stored therein.

SUMMARY OF THE INVENTION

This invention relates in general to a construction of a container, and particularly, to a new and useful container for storing devices, accessories, etc., particularly for storing a warning device for a motor vehicle, which is normally stored away in its container, and wherein the container includes a three-dimensional representation of the device stored therein, and wherein the container is made of a plurality of parts which interengage at telescoping movement one upon the other up to an amount comparable to the size of the device stored therein.

The known container for storing warning triangles or warning signal reflection devices are provided with operating instructions which are arranged at either inside the container or printed on or pasted on the outer surface of the container. Since the devices are stored in a trunk or other tool compartments of the motor vehicle and are picked up only in emergencies, which require the placing of a warning signal in association with the vehicle, there is a likelihood that the printing instructions or the label becomes damaged in the course of time by friction thereagainst during storage. This means that the operating instructions or even the identification of the device cannot be determined. In addition, such storage devices must, in many instances, be provided with instructions in a foreign language, and this would require a greater inventory of printing stamps or stickers. The operating instruction are generally arranged on the inside of the container and they are usually pulled together with the device from the container after it has been opened.

In accordance with the present invention there is provided a storage container, particularly of the type for holding a folding warning triangle or reflector in such a way that the contents of the container are readily apparent and the necessary manipulations for erecting the triangle are obvious. A container constructed in accordance with the invention includes a three-dimensional graphic representation which extends outwardly from the plane of the wall of at least one of the container parts.

In addition, the container is made up of at least two telescopic parts, which may be telescoped together and interengaged to achieve an interior dimension comparable to the size of the device to be stored therein. For this purpose each of the container parts includes interengageable projection defined on one part which engages into a corresponding complementary recess defined on the interior of the other part. In addition, the container is advantageously provided with projections located so as to be of the height which is greater than the three-dimensional representations of the device which is to be stored in the container in order that these representations will not become damaged.

Accordingly, it is an object of the invention to provide a container, particularly for storing warning devices for use in association with vehicles, boats, and the like, which includes at least one wall having at least one three-dimensional representation of the device to be stored therein and wherein the container walls also include projecting portions which project outwardly from the surface of the container beyond the top of the representation thereon in order to provide protecting outer surfaces.

A further object of the invention is to provide a container for storing devices such as warning signals, which includes two interengageable container parts having interlocking portions at spaced locations therealong which may be selectively interengaged for determining the interior dimension of the container when closed.

A further object of the invention is to provide a container which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
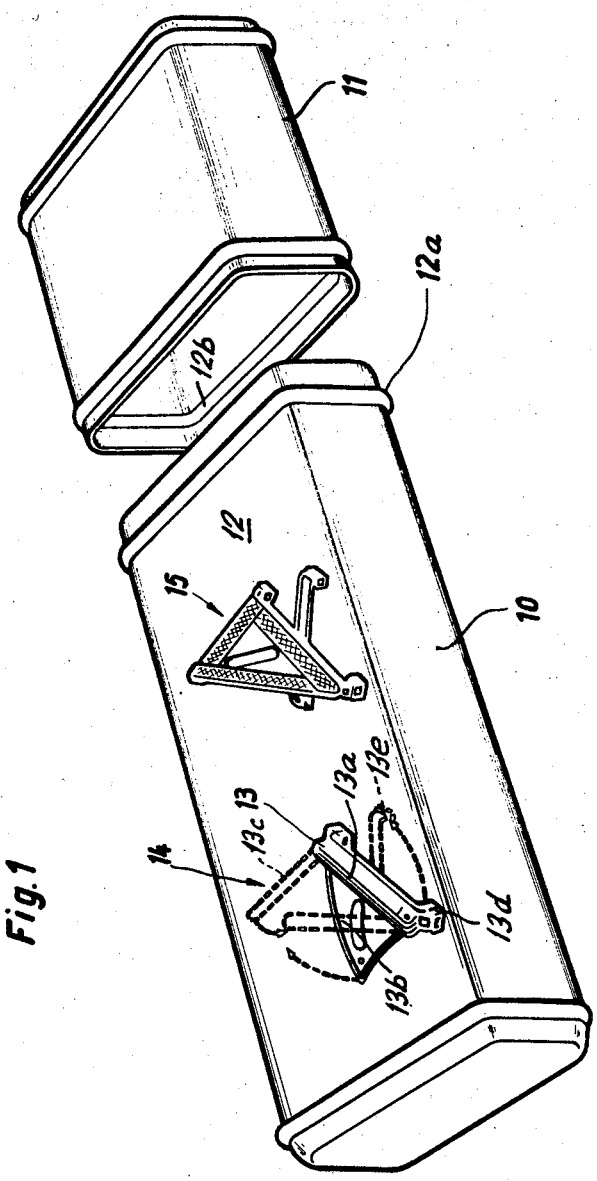
FIG. 1 is a perspective view of two part container having a graphical three-dimensional representation thereon of a folding warning triangle constructed in accordance with the invention.

Referring to the drawings in particular, the invention embodied therein in FIG. 1 comprises a container having two telescopic parts 10 and 11 which may be interengaged with each other by positioning the part 11 over the part 10 and moving it downwardly to cause a projection 12a on the part 10 to engage in a recess 12b defined on the interior of part 11.

In accordance with the invention from a plane of a top wall 12 of the container, there projects a representation or reconstruction of a warning reflective triangle generally designated 15.

In addition there is a further erectible triangle device generally designated 14, which includes a parts assembly piece 13 forming an enclosure for a base 13a and two side parts 13b and 13c which may be moved outwardly from the base part to form the triangular configuration. In addition a supporting pedestal part 13d may be shifted to the dotted line position indicated.

Figure 2:
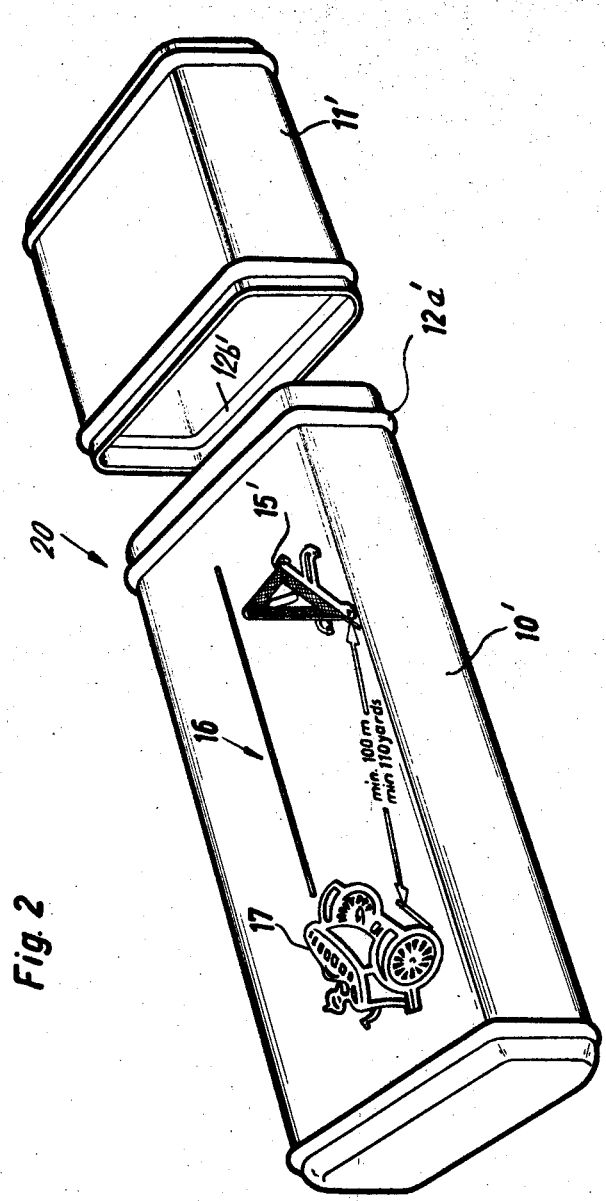
FIG. 2 is a view similar to FIG. 1 of another embodiment of the invention.

In the embodiment indicated in FIG. 2, a container generally designated 20 is provided which includes two parts 10' and 11' as in the previous embodiment. A projecting portion 12a' of the container part 10' fits into a groove portion 12b' of the part 11'. In this embodiment a graphical representation generally designated 16 is provided which includes a triangle 15' and a representation of a vehicle 17 in respect to the triangle indicating the manner in which the triangle may be properly located for warning oncoming vehicles away from a stalled vehicle 17.

Figure 3:
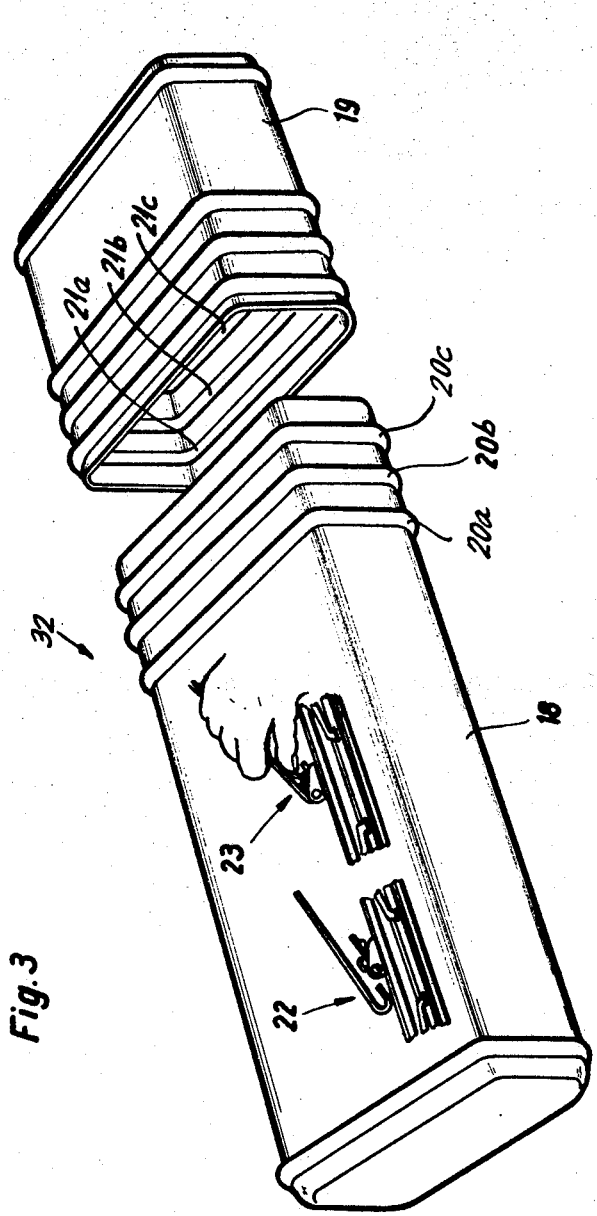
FIG. 3 is a view similar to FIG. 1 of still another embodiment of the invention.

In the embodiment illustrated in FIG. 3, a container generally designated 32, includes telescopically interengageable parts 18 and 19. The part 18 which engages inside the interior of the part 19, includes a plurality of longitudinally spaced projections 20a, 20b, and 20c, which may be engaged into a selected one of receiving grooves 21a, 21b, or 21c. This arrangement permits a maximum shifting of the part 19 in respect to the part 18 in order to vary the dimensions within the container 32. The containers may be shifted to define a maximum space therewithin by interengagement of the projection 20c, with the groove 21a. A minimum space within the container is provided when the projection 20a is engaged into the groove 21c. This construction permits a ready adaptation of the container to the size of the article to be stored therein. In the embodiment illustrated the container 32 is used for storing windshield wiper blades indicated in the relief representations generally designated 22 and 23, respectivey. The representation 22 indicates the parts of the windshield wiper which are to be connected together. The representation 23 shows how the free end of the hook shaped wiper arm is removed from the holder of its wiper blade.

What is claimed is:

1. A container for storing devices, particularly for storing warning devices for use with a motor vehicle, boat and the like, comprising first and second interengageable container parts said first part being telescopic within said second part and having a projection thereon engageable in a recess of the second part, the outer surface of at least one of said container parts having a three-dimensional graphic representation thereon which projects outwardly from the plane of said surface.

2. A container, according to claim 1, wherein said projection of said first part is formed as an annular bead, said second part groove being defined on the interior by a portion thereof which forms an annular bead on the exterior, said beads being of a depth greater than the projection of the three-dimensional graphic representation.

3. A container, according to claim 1, wherein said first part includes a plurality of longitudinally spaced projections, said second part having a plurality of longitudinally spaced grooves, said first part being engageable into said first part to permit engagement of any one of said projections with any one of said grooves, the ones of said grooves and said projections which are interengaged determining the dimensions within said container when said parts are closed together.

4. A container, according to claim 1, wherein said projection on said first part comprises an annular bead, said second part having an annular bead defined adjacent its open end which on the interior of said container defines an annular groove for receiving the projection part of said first container part, said three-dimensional graphic representation comprising a warning triangle extending outwardly on the surface of said first part, and a second representation including a collapsed warning triangle with parts which may be pivoted outwardly for erection to indicate the manner in which the device stored in the container may be erected.

5. A container, according to claim 1, wherein said three-dimensional representation comprises a warning device for a vehicle, and a second representation of said vehicle with indications of the spacing of said warning device in respect to said vehicle.

6. A container, according to claim 1, wherein said three-dimensional graphical representation comprises a first representation of a wiper blade assembly indicating the manner in which a blade arm may be assembled to the wiper blade, and a second representation of the wiper blade assembly indicating the blade arm disconnected from the blade.

References Cited

UNITED STATES PATENTS

| | | | |
|---|---|---|---|
| 3,133,663 | 5/1964 | Schurman et al. | 220—42 |
| 3,143,239 | 8/1964 | Wiley et al. | 220—42 |

GEORGE T. HALL, Primary Examiner

U.S. Cl. X.R.

40—306, 312; 220—8, 60